United States Patent Office 2,939,888
Patented June 7, 1960

2,939,888

FLUOROPERHALOGENATED ALKANES AND METHOD OF PREPARATION THEREOF

William S. Barnhart, Cranford, and Robert H. Wade, West Paterson, N.J., assignors, by mesne assignments, to Minnesota Mining & Manufacturing Company, St. Paul, Minn., a corporation of Delaware No Drawing. Original application Aug. 27, 1954, Ser. No. 452,701. Divided and this application Mar. 24, 1958, Ser. No. 725,773

4 Claims. (Cl. 260—653)

This invention relates to a new and useful class of fluoroperhalogenated organic compounds and to new methods of preparation for both this new class of compounds and for useful compounds already known. In particular, it relates to new and useful fluoroperhalogenated alkanes and to a new and useful method of preparation of aliphatic fluoroperhalogenated carboxylic acids and their salts. This application is a division of U.S. Serial No. 452,701, filed August 27, 1954.

Perfluoro alkanes and fluoroperchloro alkanes, particularly those which are normally liquid or easily liquefiable, are known in the art and have been found to be useful because of their physical properties and chemical inertness. They have been found to be particularly useful as refrigerants, heat transfer media, lubricants and hydraulic fluids. Fluoroperchloro alkanes derived from the polymerization of chlorotrifluoroethylene in the presence of a sulfuryl halide telomer have been found to be particularly useful as solvents and plasticizers for resinous polymers of chlorotrifluoroethylene.

Perfluoro alkanes and fluoroperchloro alkanes, derived from the telomerization of a particular perhalogenated monomer, are formed in mixtures wherein the individual compounds differ from each other by full monomeric units. For example, a compound derived from telomerization of chlorotrifluoroethylene may differ from the next higher and next lower boiling compounds in the reaction mixture by a $CF_2CFCl$ unit. There may be, therefore, a substantial difference in boiling points, viscosities and other relevant physical properties between the successive compounds in a telomer mixture. It may be desirable for a particular use that a physical property intermediate between the physical properties of two successive members of a telomer mixture may be desired. One of the objects of this invention is to produce fluoroperchloro alkanes having such intermediate properties.

Perfluoro carboxylic acids and fluoroperchloro carboxylic acids are also known and have been found to be useful as dispersing agents in the emulsion polymerization of halogenated olefins and as gelling agents for liquid chlorotrifluoroethylene polymers.

A method for the preparation of fluoroperchloro carboxylic acids, having an even number of carbon atoms, by the treatment with fuming sulfuric acid of a sulfuryl halide telomer of a halogenated olefin, such as chlorotrifluoroethylene, has recently ben discovered. A detailed description of this method and of the novel fluoroperchloro acids produced thereby may be found in our copending application, Serial No. 452,705, now U.S. 2,806,866.

While this method is believed to be advantageous over previous methods of producing fluoroperchloro acids, nevertheless, it has certain disadvantages which the method of the present invention overcomes.

The reaction of a sulfuryl chloride telomer of chlorotrifluoroethylene, for example, requires rather drastic conditions, including high temperatures, high concentrations of $SO_3$ in the fuming sulfuric acid, and relatively long periods of reaction. These rather drastic conditions are required because of the relative inactivity of the $CFCl_2$ end group of this telomer. The reaction of the sulfuryl chloride telomer of tetrafluoroethylene requires even more drastic conditions, since it produces a $CF_2Cl$ end group which is even less reactive.

Since the reaction of the aforesaid telomers with fuming sulfuric acid generally takes place in a system involving two liquid phases, the reaction period may be extremely extended when large volumes of reactants are involved, since the reaction takes place primarily at the interface between the phases.

Furthermore, the reaction of fuming sulfuric acid with low molecular weight telomers, of the order of four or six carbon atoms, is extremely difficult because of the necessity of operating under high pressures in order to maintain the telomer in liquid phase at the elevated temperature. Actually, since the reaction of the telomer with fuming sulfuric acid produces volatile inorganic materials, such as hydrogen chloride, as by-products, and since these volatile materials at any particular temperature have a much higher vapor pressure than the telomer, extremely high total pressures are necessary in order to obtain a relatively high vapor pressure of the telomer and thereby keep it in liquid phase.

It is an object of this invention to produce novel fluoroperchloro alkanes which are useful as refrigerants, heat transfer media, lubricants and hydraulic fluids.

It is a further object of this invention to produce novel fluoroperchloro alkanes having boiling points and other physical properties intermediate between the boiling points and physical properties of successive telomers of the same fluorinated monomer.

It is a further object of this invention to produce novel fluoroperchloro alkanes which are more compatible with and have a greater solubility for chlorotrifluoroethylene resins than the sulfuryl chloride telomer of chlorotrifluoroethylene.

It is a further object of this invention to produce novel fluoroperchloro alkanes having relatively reactive end groups and, therefore, capable of being converted to perfluoro and fluoroperchloro carboxylic acids and other perhalogenated compounds.

It is a further object of this invention to produce perfluoro and fluoroperchloro carboxylic acids by a novel two-stage process which does not require lengthy reaction times or elevated pressures.

It is a further object of this invention to produce perfluoro and fluoroperchloro carboxylic acids having from 4 to 6 carbon atoms by a novel method which does not require elevated pressures.

Other objects will appear hereinafter.

These and other objects and advantages are obtained by reacting perhalogenated telomers containing a fluorine atom in an end group with a chloride or bromide of a metal having a valence of at least 3 to convert the fluorine-containing end group to a halogenated end group which can be hydrolyzed more easily than the fluorine-containing end group.

The preferred telomers which are treated according to this invention are those with the general structure, $Cl(CF_2—CFCl)_nCl$, wherein $n$ is an integer from 2 to about 16. These telomers are prepared by the telomerizing of chlorotrifluoroethylene in the presence of the telogen, sulfuryl chloride. The telomerization preferably takes place in the presence of benzoyl peroxide which is dissolved in a solvent, such as carbon tetrachloride, while the chlorotrifluoroethylene monomer is added under pressure in a closed system. In a specific example, 3.5 parts of benzoyl peroxide are dissolved in 308 parts of carbon tetrachloride and 135 parts of sulfuryl chloride. 116 parts of chlorotrifluoroethylene monomer is added and the system is heated to about 95° C. for a period of 4 hours with agitation to produce a high yield of relatively low molecular weight polymers having the above formula. The telomeric product is relatively easy to separate into its individual compounds by distillation since it contains only compounds having an even number of carbon atoms, so that each compound has a boiling point relatively far removed from that of the next lower or next higher compound.

Telomers produced by sulfuryl halides other than sulfuryl chlorides as telogens may also be used, provided that the halogen atoms of the halides are either chlorine or fluorine atoms. Preferred telogens other than sulfuryl chloride are fluorosulfuryl chloride and sulfuryl fluoride. These telogens produce with chlorotrifluoroethylene telomers containing a CFCl$_2$ or a CF$_2$Cl end group at one end of the molecule which may be converted to a CCl$_3$ group in accordance with this invention. A detailed description of telomerization with sulfuryl halides may be found in the copending application of William S. Barnhart, Serial No. 294,495, filed June 19, 1952, now U.S. Patent No. 2,770,659.

It has been found that the telomerization reaction is aided by the presence of sulfur dioxide, as a modifying agent in a mole ratio between about 1 to 10 and about 10 to 1 with the catalyst. A detailed description of a telomerization process in the presence of a sulfuryl halide and sulfur dioxide may be found in the copending application of William S. Barnhart, Serial No. 342,743, filed March 16, 1953, now U.S. Patent No. 2,837,580.

Telomers produced from perhalogenated monomers other than chlorotrifluoroethylene may also be used as starting materials in this invention. The invention is particularly useful for those telogens having fluorine-containing end groups, such as the telomers of chlorotrifluoroethylene and tetrafluoroethylene and the telomer of unsymmetrical dichlorodifluoroethylene with a fluorine-containing sulfuryl halide. The telomer of unsymmetrical dichlorodifluoroethylene with sulfuryl chloride as a telomer has a trichloromethyl end group, but is susceptible to reaction to produce a trichloromethyl end group at its opposite end. In general, the preferred monomers may be designated as those having the structure CF$_2$=CX$_1$X$_2$ wherein X$_1$ and X$_2$ are selected from the group consisting of fluorine and chlorine atoms.

These monomers may be either homotelomerized or cotelomerized with each other or with other perhalogenated olefins, such as symmetrical dichlorodifluoroethylene, to produce telomers which are satisfactory as starting materials for this invention. To produce high yields of fluoroperchloro alkanes of specific structure, homotelomers must be used, since it is impossible to predict the order of alignment of the individual comonomer units in a cotelomer.

The telomers produced from such monomers by telomerization with the aforementioned telogens may be designated as Q$_1$—(CF$_2$—CX$_1$X$_2$)$_n$Q$_2$ wherein X$_1$ and X$_2$, Q$_1$ and Q$_2$ are halogen atoms selected from the group consisting of chlorine and fluorine, and $n$ is an integer between 2 and 16. These telomers, when reacted with a chloride or bromide of a metal having a valence of at least 3, react at either the —Q$_2$ end or at both ends to produce novel perhalo alkanes of the formula $$Z_1—CX_1X_2—(CF_2—CX_1X_2)_{n-2}—CF_2—Z_2$$

wherein X$_1$ and X$_2$ are halogen atoms selected from the group consisting of fluorine and chlorine, Z$_1$ is a perhalomethyl radical of the group consisting of chlorodifluoromethyl, trifluoromethyl, trichloromethyl and tribromomethyl radicals, Z$_2$ is a perhalomethyl radical of the group consisting of trichloromethyl and tribromomethyl radicals, and X$_1$, X$_2$ and $n$ are defined as above.

The telomers produced from the aforesaid monomers by telomerization with the particular telogen, sulfuryl chloride, may be designated as Cl—(CF$_2$—CX$_1$X$_2$)$_n$—Cl wherein X$_1$, X$_2$ and $n$ are defined as above. Such telomers, when reacted with aluminum chloride, under conditions which are preferable for converting one end of the telomer molecule, produce novel fluoroperhalo alkanes having the formula $$Cl—(CF_2—CX_1X_2)_{n-1}—CF_2—CCl_3$$

wherein X$_1$, X$_2$ and $n$ are defined as above.

The telomers produced from chlorotrifluoroethylene with any one of the aforementioned telogens may be defined as having the formula Y$_1$—(CF$_2$CFCl)$_n$—Y$_3$ wherein Y$_1$ and Y$_3$ are halogen atoms selected from a group consisting of fluorine and chlorine and $n$ is an integer from 1 to 16, such telomers, when reacted with a metal chloride or bromide, under conditions for the preferable conversion of one end of the molecule, produce novel fluoroperhalo alkanes having the formula $$Y_1(CF_2CFCl)_{n-1}—CF_2—CCl_2Y_2$$

wherein Y$_2$ is a halogen atom selected from the group consisting of chlorine and bromine and Y$_1$ and $n$ are defined as above.

The telomers produced by the telomerization of chlorotrifluoroethylene with sulfuryl chloride may be designated as Cl(CF$_2$CFCl)$_n$—Cl, wherein $n$ is an integer from 2 to 16. Such telomers, when reacted with aluminum chloride under conditions which are preferable for converting one end of the molecule, produce novel fluoroperhalo alkanes of the formula $$Cl(CF_2CFCl)_{n-1}—CF_2CCl_3$$

wherein $n$ is defined as above. When reacted with aluminum chloride under conditions preferable for converting both ends of the molecule, such telomers will produce novel fluoroperhalo alkanes of the formula $$CCl_3—CFCl(CF_2CFCl)_{n-2}—CF_2CCl_3$$

wherein $n$ is defined as above.

The telomers suitable as starting materials for the purpose of this invention are prepared, as stated above, by directly polymerizing the fluoroethylene monomer in the presence of a catalyst and one of the above-mentioned telogens. The yield of telomer of desired chain length will vary with the relative ratio of telogen to monomer, with higher ratios producing a predominance of low molecular weight material, and lower ratios producing a predominance of high molecular weight material. In general, telomers produced by any ratio of telogen to olefin from about 1 to 5 to about 3 to 1 may be used. To produce a high yield of telomer containing from 3 to 16 monomeric units, it is preferred that the telogen to olefin ratio be about 1 to 1.

Catalysts other than benzoyl peroxide, such as di-t-butyl peroxide or dichlorobenzoyl peroxide, may be employed. Favorable results are obtained by using 1% by weight benzoyl peroxide based on the monomer.

Inert solvents may or may not be present in the telomerization process. An inert solvent is any liquid which does not materially alter the normal polymerization of the fluoroethylenic compound in the presence of sulfuryl chloride or other sulfuryl halides. Carbon tetrachloride and tetrachloroethylene are examples of such solvents. It is to be noted that carbon tetrachloride is itself a telogen, but considerably less effective, than for example, sulfuryl chloride, and may, therefore, be regarded as substantially inert.

The telomers described above are reactive with the cholride or bromide of a metal having a valence of at least 3 to convert the fluorine atoms of the telomer end groups to chlorine or bromine atoms, thereby converting a CFCl$_2$ end group to a CCl$_3$, or CBrCl$_2$, a CF$_2$Cl end group to a CCl$_3$ or CBr$_2$Cl end group, and a CF$_3$ end group to a CCl$_3$ or CBr$_3$ end group, depending on whether the halogen of the metal halide is chlorine or bromine.

The preferred metal halide is aluminum chloride; however, other chlorides and bromides of metals having a valence of at least 3 may be used, such as $FeCl_3$, $AlBr_3$, $TiCl_5$, $SbCl_5$, $BrCl_3$, $SnCl_4$ and others. In general, these metal halides may be described as the Friedel-Crafts type catalysts, containing chlorine or bromine as the halogen atoms.

A sulfuryl chloride telomer of chlorotrifluoroethylene, having the formula $Cl(CF_2CFCl)_nCl$ may be converted to its chlorinated derivative $Cl(CF_2CFCl)_{n-1}CF_2CCl_3$ by treatment with aluminum chloride at a temperature ranging from about 0° C. to about 125° C. in the presence or absence of a solvent. The telomer and the halogen exchange reagent may be admixed at room temperature or below, followed by careful and gradual warming of the mixture until appreciable reaction is observed. The reaction is an exothermic one, and once it starts, external cooling may be necessary in order to keep the reaction temperature below about 85° C. In view of the exothermic nature of the reaction, it is preferable to add the telomer portionwise to the halogen exchange reagent (or vice versa) over an extended period of time while carefully observing and controlling the temperature during the addition.

The concentration of aluminum chloride to telomer may vary over a wide range, such as from about 0.1 to about a 10 molar excess. However, use of more than about a 1.5 molar excess of aluminum chloride is merely wasteful of this reagent and does not facilitate the reaction. The preferable concentration is from about 0.2 mole of halogen exchange reagent to about 1.5 moles per mole of telomer.

Any organic liquid which is inert to the reactants under the reaction conditions may be used to dissolve or suspend the starting compounds. The preferable type solvents being the liquid hydrocarbons, such as n-heptane, cyclohexane, petroleum ether; the halogenated hydrocarbons, such as carbon tetrachloride, methylene chloride, chloroform, etc.

Upon completion of the reaction, the excess aluminum chloride is hydrolyzed in the usual manner, i.e., by treating the reaction mixture with ice and hydrochloric acid. The organic compounds may be separated by extraction of the aqueous layer with a suitable solvent, such as ether or carbon tetrachloride, removal of the solvent to yield the organic extract. An alternate procedure is to subject the hydrolyzed mixture to steam distillation, the steam distillate containing the organic compounds.

The organic ether extract, or the organic layer of the steam distillate is then distilled under reduced pressure to remove any unreacted starting material and to isolate the R—$CCl_3$ compounds. The R—$CCl_3$ compounds have been characterized by chemical analysis, boiling point, index of refraction, density and molar refractivity.

$CF_2Cl$ and $CF_3$ end groups require somewhat higher temperatures for conversion to $CCl_3$, as, for example, temperatures between about 100° C. and 150° C. Time of reaction, concentration, and nature of the metal halide, and other variables will affect these conditions. Such conditions are used when treating telomers containing such end groups as the more readily hydrolyzable end groups, or when it is desired to convert both end groups of the molecule.

The fluoroperhalo alkanes prepared in accordance with the above procedure are used for compounds per se as refrigerants, heat transfer media, lubricants and hydraulic fluids. One of their chief advantages, however, over the perfluoro alkanes and fluoroperchloro alkanes derived from the telomerization of a perhalogenated olefin in the presence of a sulfuryl halide telomer, lies in the reactivity of the end group produced. The $CCl_3$ end group which is produced by the reaction of aluminum chloride with the sulfuryl chloride telomer of chlorotrifluoroethylene may be hydrolyzed to the corresponding carboxylic acids by treatment with concentrated sulfuric acid containing $SO_3$ at elevated temperatures. The concentration of excess $SO_3$ may range from substantially zero to about 30% by weight of the sulfuric acid. The temperatures employed may vary between about 125° C. and about 200° C. The hydrolysis is usually complete within about 30 hours.

Dicarboxylic acids are readily obtained under the same hydrolysis conditions when a fluoroperchloro alkane, having both ends converted to $CCl_3$, is treated with fuming sulfuric acid.

Under the conditions of the fuming sulfuric acid treatment, some formations of acid anhydrides may occur. The dicarboxylic four carbon acid readily forms a cyclic anhydride, while monocarboxylic acids may combine to produce acyclic anhydrides of higher molecular weight. Despite their higher molecular weight, the acyclic anhydrides are lower boiling than the monocarboxylic acids from which they are formed, since the acids are strong acids and highly polar compounds, and since the loss of polarity has a greater effect on boiling point than the molecular weight increase. The cyclic anhydride is, of course, lower boiling than the diacid from which it is formed, since both the polarity and the molecular weight are decreased.

These anhydrides are readily converted to the acids from which they were derived by the addition of water. On the other hand, the acids may, if desired, be converted to anhydrides by reaction with $SO_3$ or $P_2O_5$.

The hydrolysis is conveniently carried out in a glass or metal vessel equipped with a thermometer, stirrer and reflux condenser, the latter being fitted with a tube leading to a vessel containing water or basic solution. The latter device is necessary to trap the $SO_3$ fumes and any other fumes evolved during the course of the reaction. The hydrolysis may be conducted under an atmosphere of nitrogen or other inert gas.

Upon completion of the reaction, the reaction mixture is cooled and poured over ice, and the organic material isolated by extraction of the aqueous mixture with a low-boiling organic solvent, such as ether, carbon tetrachloride, methylene chloride or 1,1,2-trichloro-1,2,2,-trifluoroethane; or the aqueous mixture may be basified with a basic reagent, the unreacted and non-acidic starting material extracted with ether, followed by reacidification of the basic solution and subsequent separation of the acidic products by extraction with suitable solvent.

An alternate and preferable procedure to these is to simply extract the reaction mixture with a low-boiling organic solvent, such as any of those mentioned above. The acidic products are then separated and purified by distillation under reduced pressure. The acids have been characterized by boiling point, index of refraction, density, molar refractivity and determination of their neutralization equivalents.

Carboxylic acids, both monoacids and diacids, produced by this invention, are strong acids and react readily with alkali metal, alkaline earth and other metal hydroxides, carbonates and other basic compounds, to produce corresponding metal salts. The acids also react with gaseous ammonia or with ammonium hydroxide to produce ammonium salts. Metal and ammonium salts of the monocarboxylic acids containing at least 6 carbon atoms are particularly useful as emulsifying agents in the emulsion polymerization of perhalo polymers.

Esters of the foregoing carboxylic acids are also easily prepared by usual esterification methods involving the reaction of the mono-acid or diacid with an alcohol and the removal of water therefrom. Water may be removed by the presence of a water removal agent, such as concentrated sulfuric acid, or preferably may be removed by continuous distillation during the esterification reaction. Esters of the monoacids are particularly useful as softening agents for perhalogenated polymers, and esters of the diacids with poly alcohols form long chain highly halogenated polymers with advantageous properties.

EXAMPLE 1

*Reaction of* $Cl(CF_2-CFCl)_2-Cl$ *with aluminum chloride*

(a) *Carbon tetrachloride as solvent.*—One mole (304 grams, 176 ml.) of $Cl(CF_2CFCl)_2Cl$ (B.P. 135° C.) was added to a stirred refluxing mixture of 0.5 mole of anhydrous aluminum chloride (67 grams) in 200 ml. of carbon tetrachloride over a period of 2 hours, and the refluxing and stirring continued for an additional 3 hours. The mixture was poured into a mixture of ice and HCl and the residue in the flask also treated with ice and HCl. The total reaction mixture was then extracted with benzene. The benzene extract was washed with dilute hydrochloric acid, water, dried and distilled through a 6″ Vigreux Claisen head. A 58% yield (184.0 grams) of $Cl(CF_2CFCl)CF_2-CCl_3$ (1,1,1,3,4 pentachloropentafluorobutane) was obtained, boiling point 163–171° C., $n_D^{20}=1.4223$, $d=1.788$ and MR=45.7.

(b) *No solvent present.*—A mixture of $Cl(CF_2-CFCl)_2Cl$ (176 ml., 1 mole) and anhydrous aluminum chloride (66.5 grams, 0.5 mole) was heated with stirring for 4 hours. The temperature rose slowly to 80° C. and then rapidly to 125° C. when cooling was applied. The temperature was maintained at about 50° C. by external heating for a total of about 4 hours. Ice and hydrochloric acid were added and the mixture steam-distilled until no more heavy liquid came over. The heavy layer was distilled yielding recovered starting material and a total of 119.5 grams (0.375 mole, 50% yield based on starting dimer) of a liquid boiling at 169–171° C. which was identified as $ClCF_2-CFCl-CF_2-CCl_3$ (1,1,1,3,4-pentachloropentafluorobutane).

|  | Fraction, ° C. | $n_D^{20}$ | $d_{20}^{20}$ | Molar Refractivity (MR)[1] |
|---|---|---|---|---|
| (1) | 169–169.6 | 1.4183 | 1.799 | 44.9 |
| (2) | 169.6–171 | 1.4208 | 1.794 | 45.3 |

[1] Calculated MR for molecular weight 320.3=44.6.
*Analysis.*—Calculated for $C_4F_5Cl_5$: Cl, 55.4%. Found: Cl, 54.2%.

The structure of the product is further confirmed by mass special data which showed groups consistent with the structure $ClCF_2-CFCl-CF_2-CCl_3$ including a $-CCl_3$ end group as the most prominent peak.

EXAMPLE 2

To a liter 3-neck flask containing 104.6 grams (0.39 mole) of anhydrous aluminum bromide was added 119 grams (67.5 ml., 0.39 mole) of $Cl(CF_2-CFCl)_2Cl$ at room temperature. Immediate evolution of bromine was observed. The material was stirred, first in ice and then at room temperature for 4 hours, cooled in dry ice bath and treated with ice and hydrochloric acid and the reaction product isolated as described above. A mixture of products boiling higher than the starting material was obtained; the boiling points being as follows:

(1) 55–59° C./50 mm.
(2) 59–95° C./50 mm.
(3) 95–149° C./50 mm.
(4) 149/50 mm.—165/25 mm.

EXAMPLE 3

*Reaction of* $Cl(CF_2-CFCl)_3-Cl$ *with aluminum chloride*

(a) A mixture of 252.0 grams (0.6 mole, 139 ml.) of $Cl(CF_2-CFCl)_3-Cl$ (B.P. 203°, $d=1.82$) and 80 grams (0.6 mole) of anhydrous aluminum chloride was carefully heated with stirring for about 3.5 hours, maintaining the temperature at about 90° C. Ice and hydrochloric acid were added and the product isolated in the usual manner as described in the above examples. Distillation of the reaction product at reduced pressures gave a 64% yield (166.2 grams) of total product, the various fractions boiling at:

| Boiling Point | Weight, grams | $n_D^{20}$ | $n_{20}^{20}$ | MR[1] |
|---|---|---|---|---|
| 119.5–121° C./20 mm | 54.5 | 1.4211–17 | 1.870 | 59.3 |
| 121° C./20 mm | 54.1 | 1.4211–17 | 1.873 | 59.3 |
| 121–123.5/20 mm | 57.6 | 1.4219–17 | | |

[1] Assuming molecular weight to be 437 ($C_6Cl_5F_8$ or $Cl(CF_2CFCl)_2CF_2-CCl_3$) the calculated molar refractivity is 59.38.

(b) *With carbon tetrachloride as solvent.*—To a stirred, refluxing mixture of 80 grams (0.6 mole) of anhydrous aluminum chloride and 150 ml. of carbon tetrachloride was added 252 grams (0.6 mole) of trimer,

$Cl(CF_2CFCl)_3Cl$

After 19 hours of reflux the mixture was cooled, hydrolyzed with dilute hydrochloric acid and steam distilled. Distillation of the distillate through an 18 inch spiral column gave 0.3 mole (50% yield) of

$CF_2Cl(CFCl-CF_2)_2-CCl_3$ (1,1,1,3,5,6 hexachlorooctafluorohexane), B.P. 118–22/20 mm. and 0.7 mole (11% yield based on $C_6Cl_7F_7$) of a liquid boiling 144–7/20 mm. The molar refractivity calculated for $C_6Cl_7F_7$ is 63.5, found was 65.0. The remainder of the product was a dark residue, presumably of higher chlorine content.

EXAMPLE 4

*Hydrolysis of* $ClCF_2-CFCl-CF_2-CCl_3$ *to* $ClCF_2-CFCl-CF_2-COOH$

A mixture of 129.5 grams (0.4 mole)

$ClF_2-CFCl-CF_2-CCl_3$ (prepared as described in Examples 1a, b, above) and 200 ml. of 20% fuming sulfuric acid was heated to 150–175° C. with stirring for 22 hours, after which time the mixture was homogeneous. The solution was cooled and poured onto ice, made basic by addition of sodium hydroxide, extracted with ether to remove a trace of neutral starting material, reacidified with sulfuric acid and then extracted continuously with ether for 6 days. Distillation of the ether extract at reduced pressures yielded as the main products the following fractions totaling 77.6 grams (79% yield):

| Boiling Point | Weight (g.) | $n_D^{20}$ | $d_{20}^{20}$ | MR[1] | N.E. |
|---|---|---|---|---|---|
| (1) 89–94° C./20 mm | 55.0 | 1.3770–18 | 1.691 | 33.5 | 258.2 |
| (2) 94–96° C./20 mm | 18.9 | 1.3760–18 | 1.730 | 32.8 | 253.5 |
| (3) 96°/20 mm | 3.7 | 1.3794–18 | | | |

[1] The calculated molar refractivity (MR) was based on the molecular weight of $ClCF_2-CFCl-CF_2COOH$ (M.W.=247) and is =31.7.
N.E. of $ClCF_2-CFCl-CF_2-COOH=247.0$.
(NOTE.—N.E. of $HOOC-CFCl-CF_2-COOH=103$.)

EXAMPLE 5

*Hydrolysis of* $ClCF_2-(CFCl-CF_2)_2-CCl_3$ *to* 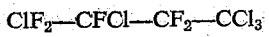
$ClCF_2(CFCl-CF_2)_2-COOH$ A mixture containing 186 grams (0.43 mole, 100 ml.) $ClCF_2-(CFCl-CF_2)_2-CCl_3$ (B.P. 118–122° C./20 mm., $d^{20}=1.873$) and 200 ml. of 20% fuming sulfuric acid was heated with stirring to about 150° C. for 20 hours after which time the solution was homogeneous. After cooling, the mixture was extracted four times with 100 ml. portions of carbon tetrachloride and then continuously extracted with carbon tetrachloride. The extracted residues were combined and distilled to yield the following fractions:

| Boiling Point | Weight (g.) | Neutralization Equivalent | Index of Refraction $n_D^{20}$ | Specific Gravity |
|---|---|---|---|---|
| (1) 69–74° C./40 mm | 37.14 | | 1.4201–18 | 1.769 |
| (2) 74° C./40 mm.–174° C./20 mm | 23.19 | | 1.4056–71 | 1.823 |
| (3) 151–161° C./10 mm | 58.80 | 355.0 | 1.3907–17 | 1.857 |
| (4) 162–164° C./10 mm | 37.65 | 357.8 | 1.3912–17 | 1.840 |

A total of 96.5 grams (fractions 3 and 4) of acidic product was obtained. It is assumed that the main product of fraction (3) is the monoacid, $$Cl-(CF_2-CFCl)_2-CF_2-COOH$$

(calculated N.E. for this $C_6$-acid is 363.4).

We claim:

1. A method of preparing a novel fluoroperhalo alkane which comprises reacting with the halide of a metal having a valence of at least 3, the halogen atoms of said halide being selected from the group consisting of chlorine and bromine, a fluoroperhalo alkane having the formula $Q^1-(CF_2-CX^1X^2)_nQ^2$ wherein $X^1$ and $X^2$, $Q^1$ and $Q^2$ are halogen atoms selected from the group consisting of chlorine and fluorine, and $n$ is an integer between 2 and 16, there being from about 0.1 mole to about 10 molar excess said metal halide per mole of fluoroperhalo alkane reactant and the reaction being carried out in a temperature range of from about 0° C. to about 150° C.

2. A method of preparing a novel fluoroperhalo alkane which comprises reacting with the halide of a metal having a valence of at least 3, the halogen atoms of said halide being selected from the group consisting of chlorine and bromine, a fluoroperhalo alkane having the formula $Cl-(CF_2CX^1X^2)_nCl$ wherein $X^1$ and $X^2$ are halogen atoms selected from the group consisting of chlorine and fluorine, there being from about 0.1 mole to about 10 molar excess, said metal halide per mole of fluoroperhalo alkane reactant and the reaction being carried out in a temperature range of from about 0° C. to about 150° C.

3. A method of producing a novel fluoroperhalo alkane which comprises reacting a sulfuryl chloride telomer of chlorotrifluoroethylene with aluminum chloride, there being at least about 0.1 mole to about 10.0 molar excess of aluminum chloride per mole of chlorotrifluoroethylene telomer and the reaction being carried out in a temperature range of from about 0° C. to about 150° C.

4. 1,1,1,3,5,6-hexachloroctafluorohexane.

References Cited in the file of this patent

UNITED STATES PATENTS

| | | |
|---|---|---|
| 2,426,637 | Murray | Sept. 2, 1947 |
| 2,668,182 | Miller | Feb. 2, 1954 |
| 2,770,659 | Barnhart | Nov. 13, 1956 |
| 2,788,375 | Ehrenfeld | Apr. 9, 1957 |

FOREIGN PATENTS

| | | |
|---|---|---|
| 581,628 | Great Britain | Oct. 18, 1946 |

OTHER REFERENCES

Henne et al.: Jour. Am. Chem. Soc., vol. 61, pages 938–940, April 1939.

Henne et al.: Jour. Am. Chem. Soc., vol. 67, pages 1906–1908, November 1945.

Henne et al.: Jour. Am. Chem. Soc., vol. 70, pages 130–132, January 1948.

Muller, Nat. Nuclear Energy Ser., Div. VII, 1, pages 567–586 (1951), abstracted in Chem. Abstracts, vol. 46, columns 7988–7990, Sept. 10, 1952.